United States Patent Office 3,056,296
Patented Oct. 2, 1962

3,056,296
FLUID QUANTITY SENSING APPARATUS
Arthur W. Lindemann, Milwaukee, Wis., assignor to Minneapolis-Honeywell Regulator Company, Minneapolis, Minn., a corporation of Delaware
Filed Nov. 14, 1957, Ser. No. 696,396
7 Claims. (Cl. 73—304)

The present invention is concerned with control apparatus and more particularly with fluid quantity sensing apparatus for indicating the quantity of fuel in a plurality of individual containers and simultaneously indicating the total quantity of fuel in these and other of the containers.

The present invention is particularly adapted for use with aircraft having a number of fuel tanks. In such aircraft it is desirable to provide an indication of the quantity of fuel remaining in any one or several of the tanks and at the same time provide indication of the fuel in all of the tanks. In one embodiment of this invention a method is provided wherein the quantity of fuel in any one of the tanks may be selectively determined while at the same time the indication of the total quantity of fuel in all of the tanks is given. Another embodiment of the present invention will allow continuous monitoring of the amount of fuel in several of the tanks, as for example the left and right wing tanks, while at the same time giving a total indication of the fuel not only in the wing tanks but in the fuselage tanks.

In the past this type of indication has been available by use of a system wherein voltages or currents of different characteristics are fed to the tank or tanks in which individual indication is desired. There are disadvantages in the use of such a system. For instance, a number of separate amplifiers must be used which makes the system heavy, costly and tends to introduce errors. Another disadvantage is the need to use a separate dielectric compensating capacitor for each of the tanks in which liquid is being measured.

Therefore, it is an object of this invention to eliminate the need for a plurality of amplifiers and capacitive compensators and to perform the required functions by the use of a single amplifier.

A further object of the present invention is to provide improved apparatus to indicate the quantity of liquid in one of a plurality of containers and at the same time to indicate the quantity of liquid in all of the containers.

Figure 1:
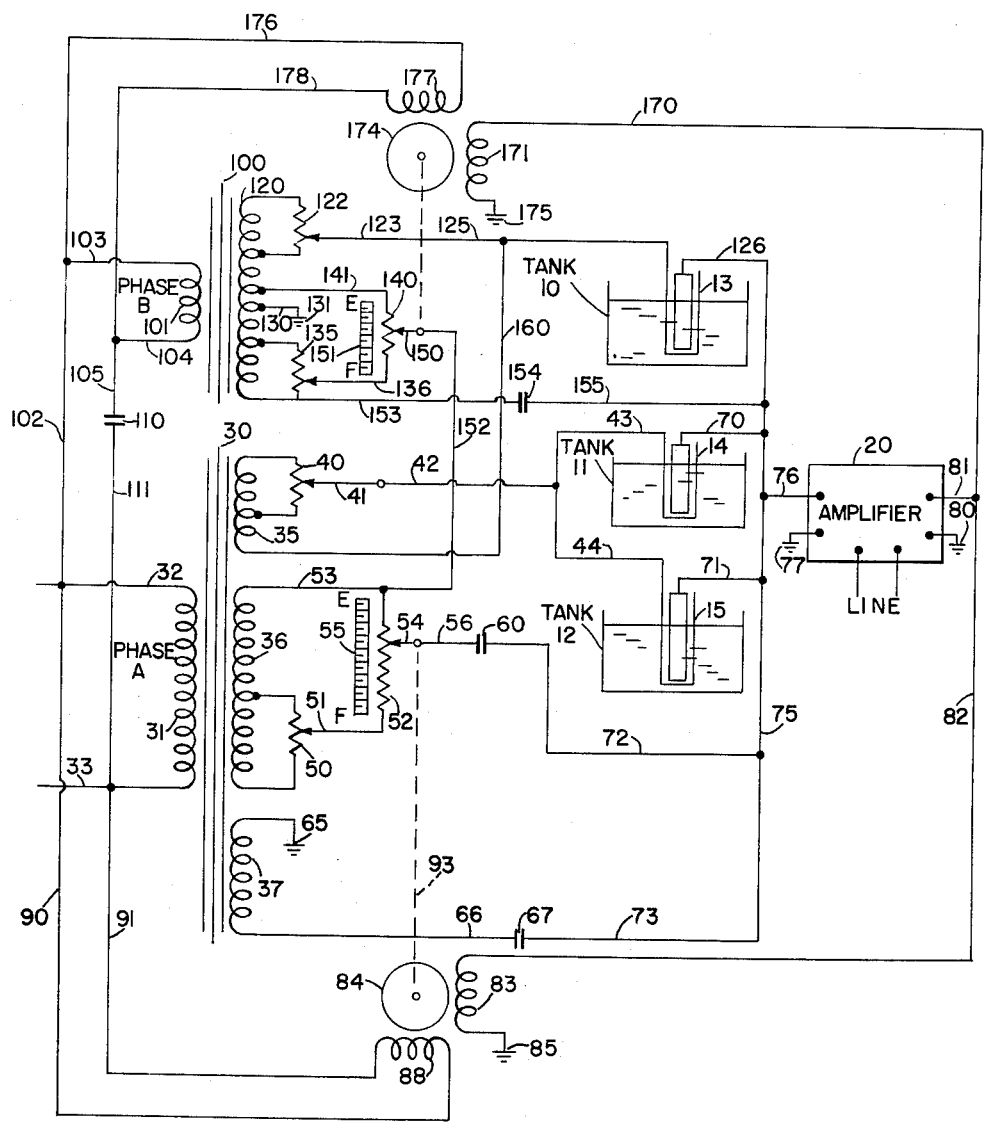
Figure 2:
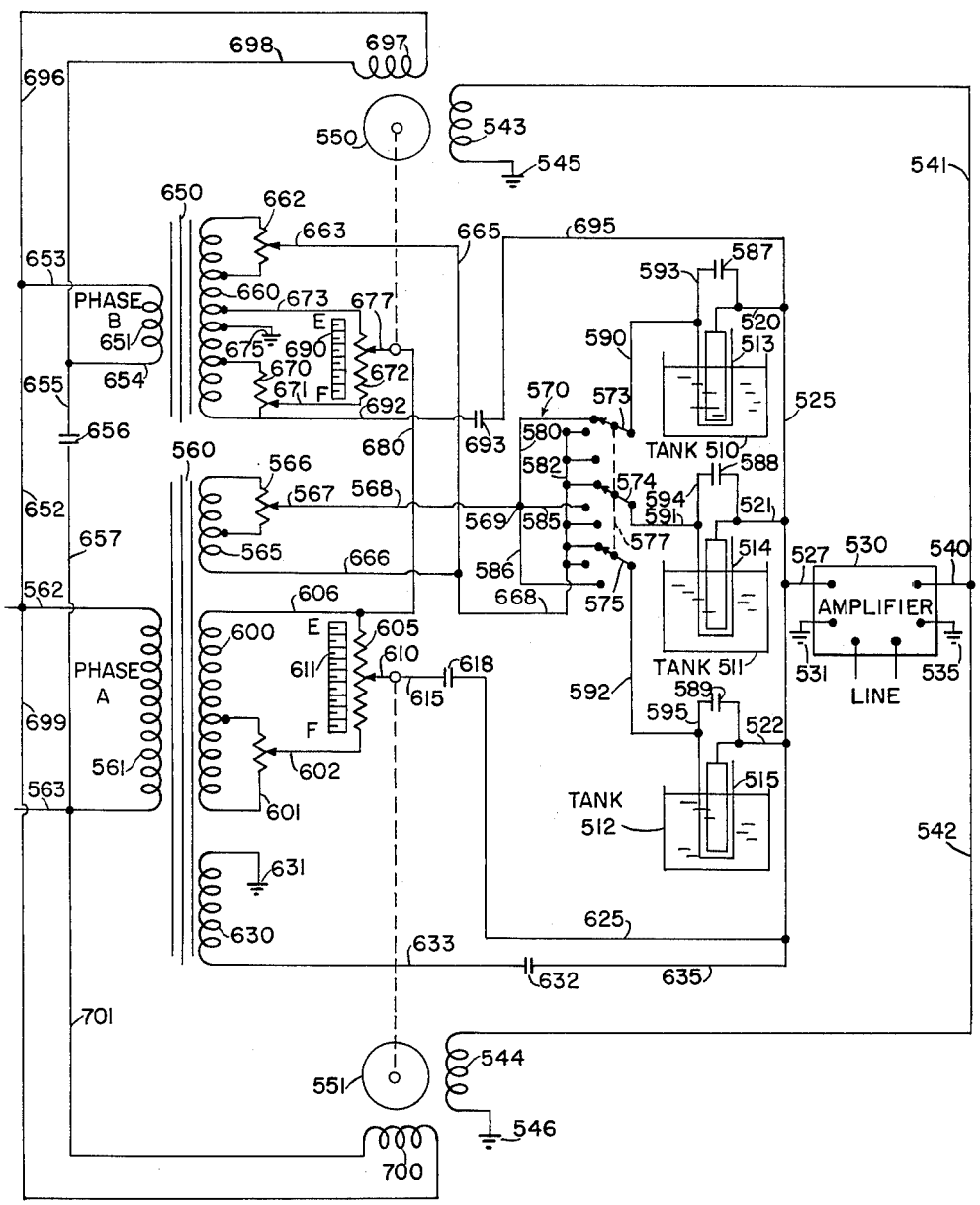

These and other objects of the present invention will be apparent to those skilled in the art upon reference to the following specification, claims, and drawings of which:

FIGURE 1 is a schematic representation of one embodiment of the present invention and FIGURE 2 is a schematic representation of a second embodiment of the present invention.

Referring to FIGURE 1, reference numerals 10, 11, and 12 designate first, second and third liquid containers which may be the fuel tanks of an aircraft. Associated with each tank unit is a capacitive type liquid level sensor or probe which may be of the type shown in the Earl C. Bowar Patent 2,560,757 in which there is minimum capacity in the tank unit or sensor when there is a minimum of fluid in the tanks. Associated with tank 10 is sensor 13, with tank 11 is sensor 14, and with tank 12 is sensor 15.

The reference numeral 20 represents the single amplifier used with this system and may be of the conventional linear type wherein an alternating current is amplified to provide an output which is an amplified reproduction of the signal applied to the input. In the present invention the output from each tank unit will give an alternating current signal which is proportional to the amount of fluid in the container in which the sensor is situated and these signals will be fed to the amplifier which in turn will provide signals to the appropriate motor and potentiometer circuitry which will balance out the signals from the sensors.

As shown in FIGURE 1 a transformer 30 having a primary winding 31 is connected by means of lead wires 32 and 33 to a source of alternating current voltage (not shown.) The phase of the alternating current voltage across primary winding 31 has been designated phase A. Transformer 30 also has secondary windings 35, 36 and 37. Across the upper portion of transformer secondary 35 is a calibration potentiometer 40 having a wiper 41 which is connected by means of conductors 42 and 43 to one side of the capacitive sensor 14. Wiper 41 is also connected by means of conductors 42 and 44 to one side of capacitive sensor 15. Transformer secondary 36 has connected across its lower portion a calibration potentiometer 50 having a wiper 51 which is connected to one end of a rebalance potentiometer 52. The other end of rebalance potentiometer 52 is connected to the upper end of transformer secondary 36 by means of conductor 53. A movable tap 54 of potentiometer 52 cooperates with an indicator scale 55 which is, as will be explained, to indicate the quantity of fuel in tanks 11 and 12. Connected to potentiometer wiper 54 by means of conductor 56 is a capacitor 60. The purpose of this capacitor is to provide a current which will rebalance the current signal in the individual tank units as will be further explained. Capacitor 60 is shown as a single capacitor but may consist of a number of parallel capacitors among which is a dielectric compensating capacitor. Transformer secondary 37 has its upper end connected to ground connection 65 and has its lower end connected by conductor 66 to a capacitor 67. The purpose of capacitor 67 is to balance the current from the tank units which exists when the tank is empty as will also be further explained.

The opposite sides of sensing capacitor 14, sensing capacitor 15, capacitor 60 and capacitor 67 are joined by means of conductors 70, 71, 72 and 73 respectively to a common conductor 75. Conductor 75 in turn is connected to the input of amplifier 20 by means of conductor 76. The other input terminal to amplifier 20 is connected to ground connection 77.

One terminal of the output of amplifier 20 is connected to ground connection 80 and the other terminal is connected by a conductor 81 and 82 to a control winding 83 of a motor 84. Motor 84 is only responsive to signals of phase "A." The other side of control winding 83 is connected to ground connection 85. The line voltage winding 88 of motor 84 is connected directly to the power line by the following traced circuit: from the power supply (not shown) through conductor 32, a conductor 90, line voltage winding 88, a conductor 91, and conductor 33, back to the power supply.

Motor 84 is operative to control the position of potentiometer wiper 54 by means of a mechanical connection 93.

The operation of the above described circuit will now be shown. From potentiometer 40 a voltage of phase "A" is applied to one side of sensing capacitor 14, by means of conductors 42 and 43. Depending upon the height of the fluid in the tank 11 a signal of phase "A" and of magnitude indicative of the quantity of fluid in tank 11 is sent to amplifier 20 by means of conductors 70, 75 and 76. At the same time a phase "A" voltage is applied by means of potentiometer 40, conductor 42 and conductor 44, to one side of sensing capacitor 15. Depending upon the height of the fluid in tank 12 a signal of phase "A" indicative of the quantity of fluid in tank 12 will be transmitted to the amplifier 20 by means of conductor 71, 75 and 76. These two signals from the tank units 14 and 15 will be added so that amplifier 20 sees, at its input, a signal which is proportional to the sum of the quantities of fluid in tanks 11 and 12. This signal is amplified by amplifier 20 and is fed to control winding 83 of motor 84 by means of conductors 81 and 82. This will cause motor 84 to turn so as to position wiper 54 along potentiometer 52. A signal then from potentiometer 52 will be sent through capacitor 60 by means of conductor 56, conductor 72, conductor 75, to amplifier 20. The phase of this signal is 180 degrees opposite to the phase of the signal on potentiometer wiper 41 since the upper portion of secondary 36 is effectively connected to phase A ground by connections to be later described. The magnitude of the signal from potentiometer 52, when at balance, is such as to nullify the effect of that part of the signal from the probes 14 and 15 due to the height of the fluid in the containers. Since capacitor 60 may include a dielectric compensator this signal may also correct for changes in capacitance of probes 14 and 15 due to changes in dielectric constant.

An empty tank signal due to the capacitance of the sensors 14 and 15 when there is no fuel in the tanks is still present and must be compensated for by a signal of equal magnitude 180 degrees out of phase with the empty tank signal. This is provided by capacitor 67, which provides a signal of the same magnitude as the empty tank capacitance of the tank units, and is connected to transformer secondary 37 which provides the required 180 degrees out of phase signal. The signal from capacitor 67 is brought to the inputs of amplifier 20 by means of conductors 73, 75 and 76. At balance, the combined signals coming from capacitors 60 and 67 is of equal magnitude and of opposite phase to the whole signal from sensors 14 and 15 and hence amplifier 20 sees no net voltage.

Any lowering of fuel in either tank 11 or tank 12 will result in a decrease in capacitance and hence current flow to amplifier 20. This signal will be amplified and sent to motor control winding 83 which will cause motor 84 to position potentiometer wiper 54 so as to send a signal through capacitor 60, 180 degrees out of phase with the signal from the sensors and of a magnitude equal to that due to the decreased capacitance of sensors 14 and/or 15. At this time the wiper 54 cooperating on calibrated scale 55 will show the amount of fuel remaining in tanks 11 and 12. Of course it must be realized that tanks 11 and 12 are only representative and any number of tanks may be used.

The above described circuit allows indication of the fuel in tanks 11 and 12 but in order to have an indication of the total quantity in all tanks including 10, a signal must be applied to all three tanks in parallel. To accomplish this, a second transformer 100 having a primary winding 101 is connected to a source of alternating current by means of the following circuit: from the source of voltage (not shown) through conductor 32, conductor 102, conductor 103, primary winding 101, conductor 104, conductor 105, through a phase shifting capacitor 110, conductor 111 and conductor 33 back to the source of voltage. The purpose of the phase shifting capacitor 110 is to place the primary windings of transformer 100 out of phase with the phase "A" which exists across primary winding 31 of transformer 30. This out of phase voltage which exists across transformer primary 101 will be referred to as phase "B." Transformer 100 has a secondary winding 120. Across the upper portion of secondary 120 is a calibration potentiometer 122 which has a wiper 123. The signal from this potentiometer is transmitted to sensor 13 by means of a conductor 125 from wiper 123. The other side of capacitive sensor 13 is connected to the input of amplifier 20 by means of conductors 126, 75 and 76. The output signal from capacitive sensor 13 is dependent upon the height of the fluid in tank 10 and is of phase "B." A center tap 130 on transformer winding secondary 120 is connected to ground connection 131. Across the lower portion of secondary 120 is a calibration potentiometer 135 having a tap or wiper 136. A rebalance potentiometer 140 is connected to wiper 136 and to a point on transformer secondary 120 just above ground connection 130 by means of conductor 141. Potentiometer 140 has a tap or wiper 150 which cooperates with the calibrated scale 151 to give an indication of the total quantity of fuel in all of the tanks as will be shown. Potentiometer wiper 150 is connected to the upper part of transformer secondary 36 by means of conductors 152 and 53. The circuit from ground connection 131 through conductor 141, potentiometer 140, wiper 150, conductor 152 and conductor 53 provides the ground connection to the upper part of secondary 36 which was previously described. The bottom of transformer secondary 120 is connected by means of lead 153 to a reference capacitor 154, the other side of which is connected by conductor 155 to conductor 75 and thence through conductor 76 to amplifier 20. The purpose of capacitor 154 is to provide the necessary counterpart to the empty tank capacitance of sensor 13. The output of amplifier 20 is connected by means of conductor 81 and conductor 170 to control winding 171 of a motor 174 and thence to ground connection 175. Motor 174 is responsive only to signals of phase "B." The line voltage winding of motor 174 is connected to the power supply by the following circuit: from the source of alternating voltage (not shown) through conductor 32, conductor 102, conductor 176, through line voltage winding 177, conductor 178, conductor 105, through phase shifting capacitor 110, conductor 111 and conductor 33, to the source of alternating voltage.

The operation of this circuit is as follows: a signal of phase "B" from secondary winding 120 is transmitted through potentiometer 122, wiper 123, conductor 125, through sensing capacitor 13, conductor 126, conductor 75 and conductor 76 to amplifier 20. The same signal is also fed from potentiometer wiper 123 through conductor 125, a conductor 160 through transformer secondary 35, potentiometer 40, potentiometer wiper 41, conductor 42, conductor 43, and 44, to capacitor sensors 14 and 15 respectively, conductors 70 and 71 respectively, conductor 75 and conductor 76 to amplifier 20. It is seen then that the signal from the upper portion of transformer secondary 120 is placed across all three capacitive sensors 13, 14 and 15 in parallel by means of the above described circuit. The output from these sensors is then added together and presented to the amplifier 20. Amplifier 20 amplifies this total signal and through conductors 81, conductor 170, control winding 171, drives motor 174 so as to position potentiometer wiper 150. The signal across the lower portion of transformer secondary 120 is 180 degrees out of phase with phase "B" and hence the signal on potentiometer wiper 150 will be 180 degrees out of phase with respect to the signal on potentiometer wiper 123. This signal is fed through conductor 152, potentiometer 52, potentiometer wiper 54, conductor 56, capacitor 60, conductor 72, conductor 75 and conductor 76, to amplifier 20. The magnitude of this signal is such as to cancel out the effect of the phase "B" signal from the capacitive sensors 13, 14 and 15 due to the height of the fuel, and may correct for changes in the dielectric constant using the same dielectric constant compensator described previously. Another signal 180 degrees out of phase with the phase "B" signal is fed from the bottom of transformer secondary 120 through conductor 153 and capacitor 154, conductor 155, to conductor 75 and conductor 76 to amplifier 20. A signal from sensors 13, 14 and 15 due to the empty tank capacitance associated with the phase "B" signal is also present. In the same way that capacitor 67 compensated for the empty tank capacitance of sensors 14 and 15 associated with phase "A," the signal from capacitor 154 compensates for the phase "B" empty tank capacitance. The combined effect of the phase "B" signals from capacitors 154 and 60 completely nullifies the phase "B" signal from sensors 13, 14 and 15 when in balance.

Considering only the phase "B" circuit, any change in the fuel level in any of the tanks will cause the amplifier to see an increase in current which will be transmitted to motor 174 to govern the position of potentiometer wiper 150 so that a signal of opposite phase and of equal magnitude will be sent back to the amplifier to cancel out the effect of the decrease in fuel level. The position of potentiometer 150 on indicator 151 indicates the total amount of fuel in all the tanks.

It is seen then, that signals of two characteristics are provided to these separate sensors in the tanks. As shown, a phase "A" and a phase "B" which may be 90 degrees out of phase with respect to each other are used. It is of course recognized that electrical characteristics other than phase may be used. For example transformers 30 and 100 might be of two different frequencies in which case motors 84 and 174 would have filters which would bypass the frequency which was not desired for control. Each motor then would operate on one of the frequencies and the same result would be accomplished. The disclosure using phase is only a preferred embodiment and the disclosure should not be so limited.

In the preferred embodiment we are able to apply signals of one phase to one group of tanks and signals of another phase to the other tank units or to all the tank units and that way have a signal at the input of the amplifier which in one phase is indicative of the quantity of fluid which is in the tanks to which that phase is applied and in the other phase is indicative of the quantity of fluid in all of the tanks. By having a single amplifier amplify these differently phased signals the necessity of having a number of amplifiers is avoided. The motors 84 and 174 are so arranged that each will only be responsive to a signal of one of the phases. Each motor drives a rebalance wiper so as to give indication of the amount of fluid which is being indicated by the phase to which it is responsive. It is also seen that by feeding the output of potentiometer wiper 150 through the system which includes transformer secondary 36 and potentiometer 52 the necessity for a number of dielectric compensating capacitors is avoided.

Referring now to FIGURE 2 in which is shown another embodiment of the present invention which allows an indication of the total quantity of fuel in a plurality of tanks as well as a selective indication of the amount of fuel existing in any one of the tanks. Reference numerals 510, 511, and 512 designate first, second and third liquid containers which may be the fuel tanks of an aircraft. As in the discussion with regard to FIGURE 1, associated with each of the tanks is a capacitive type liquid level sensor or probe 513, 514, and 515 respectively. One side of each of these capacitors is connected by means of conductors 520, 521, and 522 to a common conductor 525. Conductor 525 in turn is connected by means of conductor 527 to one terminal of the input of amplifier 530. The other input terminal of amplifier 530 is connected to ground connection 531. One output terminal of amplifier 530 is also connected to a ground connection 535 and the other output terminal is connected by means of conductor 540 to divergent conductors 541 and 542 which lead to control windings 543 and 544 and thence to ground connections 545 and 546 respectively. Control winding 543 is associated with a motor 550 and control winding 544 is associated with a motor 551.

A transformer 560 has a primary winding 561 which is connected to a source of voltage (not shown) by means of conductors 562 and 563. A secondary 565 of transformer 560 has a calibration potentiometer 566 connected across its upper portion. A wiper or tap 567 of potentiometer 566 is connected by means of conductor 568 to a terminal 569 of a switch 570. Switch 570 is a three pole three position type of switch having contact arms 573, 574 and 575 which are mechanically connected by a linkage shown at dotted line 577. Each of the contact arms is adapted to engage one of three poles selectively. In the position shown in FIGURE 2 each of the contact arms is engaging the upper of the three poles associated with it, but upon the operator's control the contact arms may simultaneously be moved to the middle position and to the lower position. The upper pole associated with contact arm 573 is connected by means of conductor 580 to the switch junction 569 and hence to wiper 567. Both of the middle pole and the lower pole associated with contact arm 573 are joined together to a common conductor 582. The central pole associated with contact arm 574 is connected by means of conductor 585 to switch junction point 569. The upper and the lower poles associated with contact arm 574 are joined together to common conductor 582. The lower pole associated with contact arm 575 is connected by means of conductor 586 to common junction 569 of switch 570 and thence to wiper arm 567. The upper and middle poles associated with contact arm 575 are connected together to common conductor 582. Contact arm 573 is connected to capacitive sensor 513 by means of conductor 590, contact arm 574 is connected to capacitive sensor 514 by means of conductor 591 and contact arm 575 is connected to capacitive sensor 515 by means of conductor 592. Padder capacitors 587, 588, and 589 are connected in parallel with the capacitive sensors 513, 514, and 515 respectively by means of conductors 593, 594, and 595. The purpose of padder capacitors 587, 588 and 589 is to equalize the empty capacitance of the tanks so that a single empty tank reference capacitor may be used as will be further explained. In the position shown then, wiper 567 of potentiometer 566 is connected to capacitive sensor 513 by means of conductors 568, 580, contact arm 573 and conductor 590. Potentiometer wiper 567 may be connected to either of the other two sensors 514, 515 by moving the switch into the middle or lower position. When the switch is in the middle position wiper arm 567 is connected to capacitive sensor 514 by means of conductor 568, conductor 585, switch contact arm 574 and conductor 591. When switch 570 is in the lower position wiper arm 567 is connected to capacitive sensor 515 by means of conductors 568, 586, contact arm 575, and conductor 592.

A secondary 600 associated with transformer 560 has connected across its lower portion a calibration potentiometer 601 having a wiper or tap 602 which is connected to the lower end of a calibration potentiometer 605. The upper end of calibration potentiometer 605 is connected by means of conductor 606 to the upper portion of transformer secondary 600. A wiper 610 of potentiometer 605 cooperates with a calibrated scale 611 to show the amount of fuel in any individual tank as will be further described. Wiper 610 is connected by means of conductor 615 to a capacitor 618. The purpose of capacitor 618 is to provide a signal to the amplifier which is 180 degrees out of phase of the signal from the tank unit to accomplish rebalance as will be described. Capacitor 618 may also contain a dielectric compensator capacitor to provide accurate indication regardless of changes in dielectric constant. Capacitor 618 is connected to amplifier 530 by means of conductors 625, 525, and 527. A secondary 630 of transformer 560 has its upper end connected to ground connection 631 and its lower end connected to a capacitor 632 by means of a conductor 633. The purpose of capacitor 632 is to compensate for the empty tank capacitance of each of the individual tank units as will be further described. Capacitor 632 is connected to amplifier 530 by means of conductor 635, conductor 525 and conductor 527. A second transformer 650 has a primary winding 651 which is connected to the source of power by the following circuit: from the source of power (not shown) through conductor 562, conductor 652, conductor 653, primary winding 651, conductor 654, conductor 655, phase shifting capacitor 656, conductor 657 and conductor 563 back to the source of power. The purpose of shifting capacitor 656 is to place the primary 651 of transformer 650 at a condition of phase "B" which may be 90 degrees out of phase with the phase "A" existing across secondary 561 of transformer 560. Transformer secondary 660 of transformer 650 has a calibration potentiometer 662 connected across the upper portion thereof. A wiper 663 of potentiometer 662 is connected by means of conductor 665 and conductor 666 to the lower part of transformer secondary 565 of transformer 560. Both the wiper 663 of potentiometer 662 and the lower portion of transformer secondary 565 are connected by means of conductor 668 to the common conductor 582 of switch 570. The signal from potentiometer 662 is then brought to sensors 514 (with the switch in the position shown in FIGURE 2) by means of conductor 665, 668, common conductor 582, switch contact arm 574 and conductor 591. The same signal is applied to sensor 515 by means of conductors 665 and 668, common conductor 582, switch contact arm 575 and conductor 592. It is seen then that a signal of phase "B" is applied to the sensors of tanks 511 and 512 by means of this circuit when the switch is in the position shown in FIGURE 2. A signal of phase "B" is also fed to sensor 513 by means of potentiometer 662, wiper 663, conductor 665, conductor 666, transformer secondary 565, potentiometer 566, wiper 567, conductor 568, conductor 580, switch arm 573, and conductor 590. All three tank units then have a signal of phase "B" applied to them simultaneously when the switch is in the position shown in FIGURE 2. If the switch were in the middle position the same results would occur by a different method. Assuming the switch to be in a middle position a signal of phase "B" from potentiometer 662 is brought to sensors 513 and 515 by means of circuits from potentiometer wiper 663, conductor 665, conductor 668, common conductor 582, switch arms 573 and 575 and conductors 590 and 592. The same signal would be applied through wiper 663, conductor 665, conductor 666, transformer secondary 565, potentiometer 566, wiper 567, conductor 568, conductor 585, switch arm 574 and conductor 591 to sensor 514. If the switch were in the lower position a signal of phase "B" would be applied to all sensors by means of the following circuit: from potentiometer 662, wiper 663, conductor 665, conductor 668, common conductor 582, switch arms 573 and 574 and conductors 590 and 591 to sensors 513 and 514. The same signal would be applied by means of wiper arm 663, conductor 665, conductor 666, transformer secondary 565, potentiometer 566, wiper 567, conductor 568, conductor 586, switch arms 575, and conductor 592 to sensor 515. It is seen that in all positions of switch 570 a signal of phase "B" is applied in parallel to all of the capacitive sensors in the tanks. This signal is brought out by means of conductor 520, 521 and 522 respectively to the conductor 525, conductor 527 to the amplifier and is indicative of the amount of fuel in all of the containers.

Across the lower portion of transformer secondary 660 of transformer 650 is a calibration potentiometer 670 having a wiper 671 connected to the lower portion of a rebalance potentiometer 672. The upper portion of rebalance potentiometer 672 is connected by means of conductor 673 to a point on transformer secondary 660 which is a little above a ground connection 675. A wiper 677 of potentiometer 672 is connected by means of conductor 680 and 606 to the upper portion of transformer secondary 600 of transformer 560. By means of the circuit from ground connection 675 through conductor 673, potentiometer 672, wiper 677, conductor 680 and conductor 606 the upper portion of transformer secondary 600 is placed at phase "A" ground and hence the phase across potentiometer 605 is 180 degrees out of phase with the signal across the secondary 565 of transformer 560, since the bottom portion of this winding is connected to phase "A" ground through conductors 666 and 665, wiper 663, potentiometer 662, transformer winding 660 and ground 675. Wiper 677 cooperates with a calibrated scale 690 to give an indication of the total amount of fuel in all of the tanks as will be further described.

The lower portion of transformer secondary 660 is connected by means of conductor 692 to a reference capacitor 693. The purpose of capacitor 693 is to compensate for the empty tank capacitance of all of the tank units as will be further described. The other side of condenser 693 is connected to amplifier 530 by means of conductor 695, conductor 525 and conductor 527.

The line voltage of motors 550 and 551 is connected to the source of power by the following circuit: for motor 550 the circuit is formed from the source of power (not shown) through conductor 562, conductor 652, a conductor 696, line voltage winding 697, conductor 698, conductor 655 through phase shifting capacitor 656, conductor 657, and conductor 563 back to the source of power. For motor 551 the line voltage is applied from the source of power through conductor 562, a conductor 699, line voltage winding 700, conductor 701, conductor 563 back to the source of power.

The operation of the above circuit may be described as follows: a signal of phase "B" is applied across all three capacitive sensors in a manner which has been described above. The signal from these sensors is applied to amplifier 530 and is representative of the total amount of fuel in all of the tanks. This signal is amplified by amplifier 530 and is fed through conductor 540, conductor 541, control winding 543 of motor 550 to ground connection 545. Motor 550 is operative to move potentiometer wiper 677 on potentiometer 672 so as to apply a voltage which is 180 degrees out of phase with phase "B" through conductors 680, potentiometer 605, wiper 610, conductor 615, capacitor 618, conductor 625, conductor 525, conductor 527 to amplifier 530. As stated this signal is 180 degrees out of phase with the signal applied to the capacitive sensors and is of such magnitude as to cancel the effect of the signals from the capacitive sensors which is due to the height of the liquid in the containers and corrects for changes in dielectric of the fuel if condenser 618 has a compensating capacitor included. There still remains a signal from each of the sensors which corresponds to the empty tank capacitance as was described in connection with FIGURE 1. To compensate for this signal a signal from the lower end of transformer secondary 660 is fed by means of conductor 692 through compensating capacitor 693 which is of size equal to the empty tank capacitance of all the sensors and their padder capacitors, through conductor 695, conductor 525, conductor 527, through amplifier 530 to ground connection 531. It is seen then, that at balance the signal from sensors 513, 514 and 515 is completely compensated for by the signals going through reference capacitor 693 and capacitor 618. Any rise or fall in liquid in the tanks will result in a signal to amplifier 530 which will drive motor 550 to reposition potentiometer wiper 677 along the potentiometer 672 so as to change the magnitude of the 180 degree signal being fed through conductor 680 and potentiometer 605, wiper 610, conductor 615, capacitor 618, conductor 625, conductor 525, conductor 527 to amplifier 530 to balance it out. The position of wiper 677 on calibrated scale 690 is indicative of the amount of fuel in all of the tanks as can be read on cooperating indicator scale 690.

At the same time that a phase "B" signal is being applied to all of the tank units, a phase "A" signal is being applied from potentiometer wiper 567 through conductor 568 and to whichever sensor has been selected by the operator moving switch 570. Assuming an indication of the amount of fuel in tank 510 is desired as well as the total amount of fuel in all of the tanks, the switch arms will be as shown in FIGURE 2. A phase "A" signal then will be applied from potentiometer wiper 567, conductor 568, conductor 580, contact arm 573, and conductor 590 to capacitive sensor 513. A signal from sensor 513 which is indicative of the amount of fuel in tank 510 will be fed through conductors 520, conductor 525 and conductor 527 to amplifier 530. This signal will be amplified and fed through conductor 540, conductor 542, control winding 544 to ground connection 546, to drive motor 551 so as to position wiper 610 on potentiometer 605. A signal of 180 degrees out of phase of phase "A" will then be applied through potentiometer wiper 610, capacitor 618, conductor 625, conductor 525, conductor 527 through amplifier 530 to ground connection 531. At balance, the size of this last named signal will be such as to equalize the signals from sensor 513 which is due to the height of the fuel. There still will remain a signal from sensor 513 which is the result of the empty tank capacitance of sensor 513. This signal is compensated for by capacitor 632 since a signal of 180 degrees out of phase "A" is applied from transformer secondary 630, conductor 633, through capacitor 632, which supplies a signal which is equal to the signal due to the empty tank capacitance of any one of the selected tank units and its padder capacitor, through conductor 635, conductor 525 and conductor 527 to amplifier 530. The size of this last signal is such as to balance out the empty tank capacitance of the sensor 513. The signals then from the sensor 513 of phase "A" is balanced out by signals from capacitors 618 and 632 so that at balance the amplifier sees no net phase "A" voltage.

It is seen then that by applying a voltage of one characteristic to one tank unit selectively, and applying a voltage of another characteristic to all of the tank units simultaneously and amplifying the total signal, an indication of the amount of fuel in the single selected tank as well as the amount of fuel in the total of all the tanks may be obtained by the use of selective motors. The characteristic of phase is only the preferred embodiment and it is obvious to one skilled in the art that other characteristics such as frequency could be utilized.

It is understood that many modifications of the present disclosure can be made without departing from the scope of the invention, and thus I do not expect to be limited by any of the particular embodiments shown herein and intend only to be limited by the following claims.

I claim:

1. Apparatus for use with a plurality of containers, comprising: a plurality of capacitive liquid level sensors, one of said sensors being associated with each of the containers, a first alternating current voltage source having a first phase, means connecting said sensors to said first voltage source to derive a signal of said first phase indicative of the total quantity of fluid in all of the containers, voltage responsive means having an input, means connecting the input of said voltage responsive means to said sensors, first variable means connected to said first voltage source to derive a signal which is 180 degrees out of phase with respect to said first phase, mechanical means connecting said voltage responsive means to said first variable means to control the signal from said first variable means in accordance with the amount of voltage of said first phase at the input of said voltage responsive means, means connecting said first variable means to the input of said voltage responsive means to balance out the signal of said first phase with the 180 degrees out of phase signal from said first variable means, a second source of alternating current voltage having a second phase, means connecting said second source of voltage to one of said sensors to derive a signal of said second phase indicative of the quantity of fluid in said one of said containers, means connecting the input of said voltage responsive means to said one of said sensors, second variable means connected to said second voltage source to derive a signal 180 degrees out of phase with respect to said second phase, mechanical means connecting said voltage responsive means to said second variable means to control the signal from said second variable means in accordance with the amount of voltage of said second phase at the input of said voltage responsive means and means connecting said second variable means to the input of said voltage responsive means to balance out the signal of said second phase with the 180 degrees out of phase signal from said second variable means.

2. Measuring apparatus for use with a plurality of containers, comprising: a plurality of capacitive liquid level sensors, one sensor being associated with each of the containers, a first source of alternating current voltage, means connecting said first source of voltage to each of said sensors to derive a signal of a first phase indicative of the quantity of liquid in all of the containers, voltage responsive means having an input connected to each of said sensors, first signal balancing means including an indicator connected to an output of said voltage responsive means sensitive to voltage of said first phase and adapted to derive a signal of a phase opposite to said first phase and of variable magnitude, means connecting said balancing means to the input of said voltage responsive means so that when said balancing means derives a signal of equal magnitude to the signal from said sensors said voltage responsive means has no voltage input of said first phase at which time said balancing means stops at a position indicative of the quantity of liquid in all of the containers, a second source of alternating current voltage, means selectively connecting said second source of voltage to one of said sensors to derive a signal of a second phase indicative of the quantity of liquid in one of the containers, means connecting the input of said voltage responsive means to said selected sensor, second signal balancing means including an indicator sensitive to said second phase connected to the output of said voltage responsive means for deriving a signal of phase opposite to said second phase and of variable magnitude, means connecting said second balancing means to the input of said voltage responsive means so that when said second balancing means derives a signal of equal magnitude to the signal from said selected sensor said voltage responsive means has no input voltage of said second phase at which time said second balancing means indicates the quantity of liquid in said selected container.

3. Apparatus for measuring total quantity of liquid in a plurality of containers and selectively measuring quantity of liquid in each of the containers comprising: capacitive liquid level sensing means associated with each of the containers, means selectively applying a first voltage of a first phase to any one of the sensing means so that a signal is developed indicative of the quantity of liquid in any one of the containers, signal responsive means, first means connected to said signal responsive means for deriving a voltage of such magnitude and phase as to nullify the effect of said signal, means responsive to said signal responsive means to indicate the quantity of liquid in the said one of the containers, means applying a second voltage of different phase from said first voltage to all of said sensing means to derive a total signal indicative of the quantity of liquid in all of the containers, means applying said total signal to said signal responsive means, second means connected to said signal responsive means to derive a signal of such magnitude and phase as to nullify the effect of said total signal and means responsive to said signal responsive means to indicate the total quantity of liquid in all of said containers.

4. In a system of the class described, a first circuit for obtaining a signal of a first electrical characteristic indicative of the quantity of fluid in a first plurality of containers, a second circuit for obtaining a signal of a second electrical characteristic capable of being distinguished from said first characteristic indicative of the total quantity of fluid in said first and a second plurality of containers, voltage responsive means having an input connected to said first and second circuits, a plurality of control means connected to an output of said voltage responsive means and each control means being responsive to signals of one of said different characteristics, a third circuit for obtaining a signal capable of nullifying said signal of the first characteristic, means connecting one of said control means to said third circuit to control the signal therefrom, a fourth circuit for obtaining a signal capable of nullifying said signal of the second characteristic, means connecting another of said control means to said fourth circuit to control the signal therefrom, and means connecting said third and fourth circuits to the input of said voltage responsive means.

5. Fluid quantity indicating apparatus comprising a first circuit for obtaining a signal of a first characteristic indicative of a quantity of fluid in a first plurality of containers, a second circuit for obtaining a signal of said first characteristic 180 degrees out of phase with said first signal and of variable magnitude, a third circuit for obtaining a signal of a second characteristic capable of being used separately from said first characteristic and indicative of the total quantity of fluid in said first and a second plurality of containers, a fourth circuit for obtaining a signal of said second characteristic 180 degrees out of phase with said second signal and of variable magnitude, voltage responsive means, means joining all of said circuits to an input of said voltage responsive means, and first and second means connected to an output of said voltage responsive means and responsive to said first and second characteristics respectively to control the magnitudes of the signals from said second and fourth circuits.

6. Apparatus for concurrently measuring the total quantity of fluid in a plurality of containers and the individual quantity in one of the containers comprising: a first circuit for obtaining a signal of a first characteristic and of magnitude indicative of the quantity of fluid in a first container; a second circuit for obtaining a signal of said first characteristic 180 degrees out of phase with said first signal and of variable magnitude; a third circuit for obtaining a signal of a second characteristic capable of being used separately from said first characteristic and of magnitude indicative of the total quantity of fluid in the plurality of containers including the first container; a fourth circuit for obtaining a signal of said second characteristic 180 degrees out of phase with said second signal and of variable magnitude; voltage responsive means; means connecting all of said circuits to an input of said voltage responsive means; and first and second means connected to an output of said voltage responsive means and responsive to said first and second characteristics respectively to control the magnitudes of the signals from said second and fourth circuits.

7. A multiplexing fuel gage system for use with a plurality of capacitive tank units selectively to determine the fuel quantity in the individual tanks and for continuously totalizing the quantity in all of the tanks comprising an individual electrical bridge and a totalizer electrical bridge having a common node terminal, selector means to connect any one of said units in said individual bridge and to connect the remaining units in said totalizer bridge, means to energize said bridges with voltages in phase quadrature relative to each other, means serially connecting said bridges to present a voltage having a zero degree and a ninety degree component to be applied to the selected unit in the individual bridge and solely a ninety degree component to be applied to the remaining units in said totalizer bridge whereby the signal developed at said common node terminal has a zero degree component reflecting the value of said selected unit and a ninety degree component reflecting the combined values of all of said units, and phase-division means responsive to said signal separately to indicate the values of said zero degree and ninety degree components.

References Cited in the file of this patent

UNITED STATES PATENTS

| | | |
|---|---|---|
| 2,793,529 | Bancroft | May 28, 1957 |
| 2,833,147 | Franco | May 6, 1958 |
| 2,838,933 | Williamson | June 17, 1958 |
| 2,896,454 | Storm | July 28, 1959 |